United States Patent [19]

Oka et al.

[11] Patent Number: 5,294,492
[45] Date of Patent: Mar. 15, 1994

[54] ACICULAR MAGNETIC IRON OXIDE PARTICLES

[75] Inventors: Hiroshi Oka, Hiroshima; Kazuaki Kouziro; Toshitada Shigemura, both of Ube; Tomohisa Moriya, Hiroshima; Katsumi Yamashita, Hiroshima; Kazushi Takama, Hiroshima; Takanobu Uemoto, Hiroshima; Kazuhiro Fujita, Hiroshima, all of Japan

[73] Assignee: Toda Kogyo Corp., Hiroshima, Japan

[21] Appl. No.: 722,472

[22] Filed: Jul. 2, 1991

[30] Foreign Application Priority Data

Oct. 31, 1990 [JP] Japan ............... 296834/90

[51] Int. Cl.$^5$ .................... B32B 15/02
[52] U.S. Cl. .................... 428/403; 252/62.58; 252/62.59; 252/62.63; 252/62.64
[58] Field of Search ............. 428/403, 689, 697; 252/62.63, 62.64, 62.58, 62.59

[56] References Cited

U.S. PATENT DOCUMENTS

| | | | |
|---|---|---|---|
| 4,082,905 | 4/1978 | Stephan et al. | 252/62.58 |
| 4,136,158 | 1/1979 | Okuda et al. | 423/632 |
| 4,268,540 | 5/1981 | Scott et al. | 427/127 |
| 4,400,432 | 8/1983 | Buxbaum et al. | 252/62.58 |
| 4,406,694 | 9/1983 | Mishima et al. | 75/0.5 AA |
| 4,437,881 | 3/1984 | Mishima et al. | 75/0.5 AA |
| 4,495,164 | 1/1985 | Okuda et al. | 423/266 |
| 4,514,216 | 4/1985 | Mishima et al. | 75/0.5 AA |
| 4,539,261 | 9/1985 | Nakata et al. | 428/403 |
| 4,851,258 | 7/1989 | Koroyama et al. | 252/62.58 |
| 4,873,010 | 10/1989 | Takedoi et al. | 252/62.59 |

FOREIGN PATENT DOCUMENTS 0394034 10/1990 European Pat. Off. .
57-198607 2/1983 Japan .

Primary Examiner—Paul J. Thibodeau
Assistant Examiner—D. S. Nakarani
Attorney, Agent, or Firm—Nixon & Vanderhye

[57] ABSTRACT

Disclosed herein is a process for producing acicular magnetic iron oxide particles comprising the steps of: mixing an aqueous dispersion of acicular magnetic iron oxide particles with an aqueous solution of a Co salt and an alkaline aqueous solution, or an aqueous solution of a Co salt, an aqueous solution of an Fe(II) salt and and an alkaline aqueous solution; and heat-treating the alkaline suspension solution obtained at 50° to 100° C.; wherein an Sr salt, a Ba salt or an Sr salt and a Ba salt is added to one selected from the group consisting of said aqueous dispersion of acicular magnetic iron oxide particles, said aqueous solution of a Co salt, said aqueous solution of an Fe(II) salt, said alkaline aqueous solution and said alkaline suspension solution before heat-treatment, and at least one selected from the group consisting of Si compound, Al compound, Zn compound and Mg compound is added to one selected from the group consisting of said aqueous dispersion of acicular magnetic iron oxide particles, said aqueous solution of a Co salt, said aqueous solution of an Fe(II) salt, said alkaline aqueous solution, said alkaline suspension solution before heat-treatment and said alkaline suspension solution during heat-treatment.

1 Claim, No Drawings

ACICULAR MAGNETIC IRON OXIDE PARTICLES

BACKGROUND OF THE INVENTION

The present invention relates to a process for producing acicular magnetic iron oxide particles for magnetic recording which have a high coercive force and an excellent erasing characteristic.

With progressing miniaturization and weight-reduction of magnetic recording and reproducing apparatuses in recent years, the necessity for a recording medium having a higher performance such as a magnetic tape and a magnetic disk has been increasing more and more. In other words, a magnetic recording medium is required to have a higher recording density.

In order to improve the recording density of a magnetic recording medium, the particles of the magnetic material of the magnetic recording medium must have as high a coercive force as possible. This fact is described in, for example, *Reports of Technical Researches of the Institute of Electronics and Communication Engineers of Japan*, MR77-36 (1987), p. 37, "In order to improve the recording density of a magnetic tape, it is necessary to enhance the coercive force of the magnetic powder which is used for the tape".

As acicular magnetic iron oxide particles having a high coercive force, (1) Co-doped acicular magnetic iron oxide particles and (2) Co-coated acicular magnetic iron oxide particles are conventionally known. The coercive force of these acicular iron oxide particles have a tendency of enhancing with the increase of the Co content. The Co-doped particles (1) are obtained by adding a Co salt to the formulation reaction system of the acicular goethite particles before the reaction, thereby obtaining Co-containing acicular goethite particles, and reducing the Co-containing acicular goethite particles to obtain Co-doped acicular magnetite particles or further oxidizing the thus-obtained magnetite particles to obtain Co-doped acicular maghemite particles. The Co-coated particles (2) are obtained by reducing the acicular goethite particles to obtain acicular magnetite particles or further oxidizing the thus-obtained acicular magnetite particles to obtain acicular maghemite particles, and modifying the surface of the acicular magnetite particles or acicular maghemite particles as precursor particles, thereby obtaining acicular magnetite particles or acicular maghemite particles coated with Co or Co and Fe(II).

Since a magnetic recording medium is repeatedly used for a long time for recording and erasing, it is required to have an excellent erasing characteristic.

In order to satisfy this demand against a magnetic recording medium, it is necessary that the magnetic iron oxide particles used for the magnetic recording medium have an excellent erasing characteristic.

Japanese Patent Publication Nos. 60-51242 (1985) and 60-51243 (1985) and Japanese Patent Application Laid-Open (KOKAI) No. 61-111508, for example, describe a method of improving various properties of Co-coated acicular magnetic iron oxide particles by adding an Sr salt or a Ba salt together with a Co salt at coating the magnetic iron oxide particle with Co. Japanese Patent Application Laid-Open (KOKAI) Nos. 55-72007 (1980), 59-50504 (1984), 59-159502 (1984), 60-165703 (1985), 1-219025 (1989) and 1-290534 (1989), for example, describe a method of improving various properties of Co-coated acicular magnetic iron oxide particles by adding at least one selected from the group consisting of Si compound, Al compound, Zn compound, Mg compound and Ca compound together with a Co salt at coating the magnetic iron oxide particle with Co.

As described above, acicular magnetic iron oxide particles having a high coercive force and an excellent erasing characteristic are in the strongest demand at present. Though the above-described Co-doped acicular magnetic iron oxide particles have a high coercive force, the coercive force distribution enlarges due to the diffusion of Co in crystals, etc., resulting in the deterioration in the erasing characteristic.

This phenomenon is described in the said *Reports of Technical Researches of the Institute of Electronics and Communication Engineers of Japan*, "Co-solid solution (doped) magnetic iron oxide powder suffers from a serious defect in that since the coercive force thereof is apt to change with heat and passage of time, when a tape is produced by using the magnetic powder, the thus-obtained tape is inferior in print through and erasing characteristic. This defect is considered to be caused by the fact that Co ions move in crystals even at room temperature."

In contrast, the said Co-coated acicular magnetic iron oxide particles have not only a high coercive force but also a superior erasing characteristic as compared to that of Co-doped magnetic iron oxide particles. This phenomenon is described in the said *Reports of Technical Researches of the Institute of Electronics and Communication Engineers of Japan*, ". . . In the Co-epitaxial (Co-coated) magnetic iron oxide powder, since it has a double structure, these defects are solved. The Co-epitaxial magnetic iron powder is stable thermally independance to change with time, and the tape produced by using the magnetic powder has excellent print through and erasing characteristic . . . "

However, there is no end to the demand for the improvement of the erasing characteristic, and it is pointed out that the said Co-coated acicular magnetic iron oxide particles cannot be said to have a satisfactory erasing characteristic, since the coercive force distribution thereof still enlarges.

This fact is described in, for example, Japanese Patent Application Laid-Open (KOKAI) No. 61-17426 (1986), " . . . It has been found that in the above-described magnetic powder using the $\gamma$-$Fe_2O_3$ particles, the coercive force distribution has a tendency of enlarging as the $\gamma$-$Fe_2O_3$ particles become smaller, and a tendency of further enlarging if these particles are coated with cobalt. . . . If the above-described Co-coated $\gamma$-$Fe_2O_3$ particles are made smaller in order to realize high-density recording, although a predetermined coercive force (Hc) is obtained, the magnetic powder is deteriorated in the coercive force distribution and is inferior in the erasing characteristic. . . . "

The coercive force distribution of Co-coated acicular magnetic iron oxide particles has a tendency of enlarging with the increase of the Co content, resulting in the deterioration in the erasing characteristic. That is, there is a reverse correlation between the improvement of the coercive force distribution and the improvement of the coercive force.

Accordingly, it is a technical problem of the present invention to improve the erasing characteristic while maintaining the coercive force of Co-coated acicular magnetic iron oxide particles.

As a result of the present inventors' ernest study, it has been found that in a process for producing acicular magnetic iron oxide particles comprising heat-treating at 50° to 100° C., an alkaline suspension solution which is obtained by mixing an aqueous dispersion of acicular magnetic iron oxide particles, an aqueous solution of a Co salt and an alkaline aqueous solution or by mixing an aqueous dispersion of acicular magnetic iron oxide particles, an aqueous solution of a Co salt, an aqueous solution of an Fe(II) salt and an alkaline aqueous solution so as to coat (modify) the acicular magnetic iron oxide particles with Co or Co and Fe(II), by adding an Sr salt and/or a Ba salt to one selected from the group consisting of the aqueous dispersion of acicular magnetic iron oxide particles, the aqueous solution of a Co salt, the aqueous solution of an Fe(II) salt, the alkaline aqueous solution and the alkaline suspension solution before heat-treatment, and adding at least one selected from the group consisting of Si compound, Al compound, Zn compound and Mg compound to one selected from the group consisting of the aqueous dispersion of acicular magnetic iron oxide particles, the aqueous solution of a Co salt, the aqueous solution of an Fe(II) salt, the alkaline aqueous solution, the alkaline suspension solution before heat-treatment and the alkaline suspension solution during heat-treatment, the said technical problems have been solved. The present invention has been attained on the basis of this finding.

SUMMARY OF THE INVENTION

In an aspect of the present invention, there is provided a process for producing acicular magnetic iron oxide particles comprising the steps of: mixing an aqueous dispersion of acicular magnetic iron oxide particles with (i) an aqueous solution of a Co salt and an alkaline aqueous solution, or (ii) an aqueous solution of a Co salt, an aqueous solution of an Fe(II) salt and an alkaline aqueous solution; and heat-treating the alkaline suspension solution obtained at 50° to 100° C., wherein an Sr salt and/or a Ba salt is added to one selected from the group consisting of the aqueous dispersion of acicular magnetic iron oxide particles, the aqueous solution of a Co salt, the aqueous solution of an Fe(II) salt, the alkaline aqueous solution and the alkaline suspension solution before heat-treatment, and at least one selected from the group consisting of Si compound, Al compound, Zn compound and Mg compound is added to one selected from the group consisting of the aqueous dispersion of acicular magnetic iron oxide particles, the aqueous solution of a Co salt, the aqueous solution of an Fe(II) salt, the alkaline aqueous solution, the alkaline suspension solution before heat-treatment and the alkaline suspension solution during heat-treatment.

DETAILED DESCRIPTION OF THE INVENTION

As the acicular magnetic iron oxide particles as precursor particles in the present invention, acicular maghemite particles, acicular magnetite particles ($FeO_x \cdot Fe_2O_3$, $0 < x \leq 1$) and particles wherein at least one selected from Co, Ni, Si, Al, Zn, P and the like is contained in these particles are usable.

As the aqueous solution of a Co salt in the present invention, aqueous solutions of cobalt sulfate, cobalt chloride, cobalt nitrate and the like are usable.

The amount of aqueous solution of a Co salt added is 0.1 to 15 wt %, preferably 0.1 to 10 wt % calculated as Co based on the precursor particles. If it is less than 0.1 wt %, the modifying effect of cobalt is not prominent. If it exceeds 15 wt %, the coercive force distribution of the acicular magnetic iron oxide particles obtained enlarges, thereby making the improvement of the erasing characteristic difficult.

As the aqueous solution of an Fe(II) salt in the present invention, aqueous solutions of ferrous sulfate, ferrous chloride and the like are usable.

The amount of aqueous solution of an Fe(II) salt added is 0.1 to 15 wt %, preferably 0.1 to 10 wt % calculated as Fe(II) based on the precursor particles. If it is less than 0.1 wt %, the coercive force improving effect is reduced and the electric resistance increases. If it exceeds 15 wt %, the coercive force distribution of the acicular magnetic iron oxide particles obtained enlarges, thereby making the improvement of the erasing characteristic difficult.

As the alkaline aqueous solution in the present invention, an aqueous solution of sodium hydroxide, an aqueous solution of potassium hydroxide and the like are usable.

The OH-group concentration in the alkaline suspension solution, after the alkaline aqueous solution is added, is preferably 0.05 to 3.0 mol/l. If it is less than 0.05 mol/l, an appropriate modification tends to be difficult to take place. If it exceeds 3.0 mol/l, the cobalt hydroxide tends to begin unfavorably to dissolve.

The heat-treating temperature in the present invention is 50° to 100° C. If it is lower than 50° C., it is difficult to produce the target product, or a long-time treatment is necessary for the production. Even it is exceeds 100° C., it is possible to obtain the target product, but it is not preferable from the point of view of economy because a special apparatus such as an autoclave is necessary.

The atmosphere for heat treatment may be either a non-oxidizing atmosphere in the stream of an inert gas such as $N_2$ or an oxidizing atmosphere in the stream of an oxygen-containing gas such as air.

As the Sr salt in the present invention, strontium chloride, strontium sulfate, strontium hydroxide, strontium carbonate, strontium acetate and the like are usable.

As the Ba salt in the present invention, barium chloride, barium sulfate, barium hydroxide, barium carbonate, barium acetate and the like are usable.

The Ba salt and/or Sr salt in the present invention may be added to any of the aqueous dispersion of acicular magnetic iron oxide particles, the aqueous solution of a Co salt, the aqueous solution of an Fe(II) salt, the alkaline aqueous solution and the alkaline suspension solution before heat-treatment. In any case, the object of the present invention is achieved.

The amount of Ba salt and/or Sr salt added is 0.05 to 10 wt %, preferably 0.05 to 5.0 wt %, more preferably 0.05 to 3.0 wt % calculated as Ba and/or Sr based on the precursor particles. If it is less than 0.05 wt %, the modifying effect, namely, the improvement of the coercive force cannot expected. If it exceeds 10 wt %, the saturation magnetization of the acicular magnetic iron oxide particles is unfavorably lowered.

As the Si compound, water glass, colloidal silica, sodium silicate, potassium silicate, silicon dioxide and the like are usable.

As the Al compound, aluminum sulfate, aluminum chloride, sodium aluminate, aluminum hydroxide, aluminum nitrate, aluminum acetate, aluminum oxide, alumina sol, aluminum oxalate and the like are usable.

As the Zn compound, zinc sulfate, zinc chloride, zinc oxide, zinc hydroxide, zinc nitrate, zinc acetate, zinc oxalate and the like are usable.

As the Mg compound, magnesium sulfate, magnesium chloride, magnesium hydroxide, magnesium nitrate, magnesium acetate, magnesium oxalate, magnesium carbonate and the like are usable.

At least one selected from the group consisting of Si compound, Al compound, Zn compound and Mg compound (herein after referred to as "specific compound") may be added to any of the aqueous dispersion of acicular magnetic iron oxide particles, the aqueous solution of a Co salt, the aqueous solution of an Fe(II) salt, the alkaline aqueous solution, the alkaline suspension solution before heat-treatment and the alkaline suspension solution during heat-treatment. In any case, the object of the present invention is achieved.

The amount of the specific compound added is 0.01 to 5.0 wt %, preferably 0.01 to 3.0 wt %, more preferably 0.01 to 2.0 wt % calculated as Si, Al, Zn and/or Mg based on the precursor particles. If it is less than 0.01 wt %, it is difficult to improve the erasing characteristic of the acicular magnetic iron oxide particles obtained. If it exceeds 5.0 wt %, the saturation magnetization of the acicular magnetic iron oxide particles obtained is lowered.

The order of adding the Sr salt and/or the Ba salt and the specific compound may be selected as desired or they may be added simultaneously.

The total amount of Co, Fe(II), Sr, Ba, Si, Al, Zn and Mg added acts on the acicular magnetic iron oxide particles.

The effect intended in the present invention cannot be obtained either in the case in which only the Sr salt and/or the Ba salt is added to any of the above-described solutions or in the case in which only the above-described specific compound is added to any of the above-described solutions, as shown in later-described comparative examples. Therefore it is considered that acicular magnetic iron oxide particles having a high coercive force and an excellent erasing characteristic, are obtained according to the present invention due to the synergistic effect of the Sr salt or the Ba salt, and the above-described specific compound.

The modified magnetic iron oxide particles obtained according to the present invention have an average major axial diameter of 0.05 to 1.0 μm, preferably 0.1 to 0.4 μm; an aspect ratio (major axial diameter/minor axial diameter) of 3 to 15, preferably 5 to 10; a BET specific surface area of 10 to 80 m²/g, preferably 10 to 60 m²/g; and an erasing characteristic of not less than 46.5 dB, preferably not less than 47.5 dB.

According to the process for producing acicular magnetic iron oxide particles of the present invention, it is possible to produce magnetic particles having a high coercive force and an excellent erasing characteristic, as shown in the later-described examples. Thus, these particles are suitable as acicular magnetic iron oxide particles for high-density recording.

EXAMPLES

The present invention will be explained in more detail while referring to the following non-limitative examples and comparative examples.

The average particle diameters of the particles in the following examples and comparative examples were measured in electron micrographs.

The magnetic characteristics of the magnetic iron oxide particles were measured by using sample vibrating type magnetometer Model VSM-3S-15 (produced by Toei Kogyo K.K.) and applying an external magnetic field up to 10 KOe.

The erasing characteristic of the particles is represented by the value measured in accordance with the "Method of measuring the erasing magnetization of magnetic powder" described on pp. 152 to 153 in *Proceedings of Spring Meeting in* 1986 of the Japan Society of Powder and Powder Metallurgy. In other words, after a direct magnetic field of 10 KOe was applied to a sample, the residual magnetization (Mr) was measured. The sample was set in an erasing divice. After an erasing magnetic field of 800 Oe to zero was applied to the sample, the residual magnetization (Me) was measured. The value of 20 log Me/Mr (dB) was obtained, and the observed value of the erasing characteristic was thus obtained. Since the erasing characteristic has a close relationship with the coercive force, and the erasing characteristic is apt to be deteriorated with the increase in the coercive force, the observed value was corrected to the value of the erasing characteristic at a coercive force of 700 Oe.

EXAMPLE 1

Acicular maghemite particles having an average major axial diameter of 0.20 μm, an aspect ratio (major axial diameter/minor axial diameter) of 7.0, a BET specific surface area of 36.2 m²/g, a coercive force of 370 Oe and a saturation magnetization of 74.0 emu/g were used as precursor particles. An aqueous dispersion obtained by dispersing 100 g of the precursor particles in 0.8 l of water was mixed with 200 ml of an aqueous solution with 0.125 mol of Fe(II), 0.05 mol of Co and 0.003 mol of Sr dissolved therein (Fe(II) corresponds to 7 wt % based on the precursor particles, Co corresponds to 3 wt % based on the precursor particles and Sr corresponds to 0.25 wt % based on the precursor particles), which were obtained by using ferrous sulfate, cobalt sulfate and strontium sulfate. To the mixture, 500 ml of 6-N an aqueous solution of NaOH was added to obtain a alkaline suspension solution having an OH-group concentration of 2.0 mol/l. After the temperature of the alkaline suspension solution obtained was raised to 100° C., 1.38 g of water glass No. 3 (produced by Tokuyama Soda Co., Ltd.) (the Si content corresponds to 29.0 wt % calculated as $SiO_2$) (Si corresponds to 0.187 wt % based on the precursor particles) was to the alkaline suspension solution and the resultant alkaline suspension solution was held for 30 minutes under stirring while preventing air from mixing therewith, thereby precipitating black brown particles.

The precipitated particles were filtered out, washed with water and dried by an ordinary method, thereby obtaining acicular maghemite particles coated (modified) with Co and Fe(II).

The thus-obtained acicular maghemite particles modified with Co and Fe(II) had an average major axial diameter of 0.20 μm, an aspect ratio (major axial diameter/minor axial diameter) of 6.9, a BET specific surface area of 35.5 m²/g, a coercive force of 762 Oe, a saturation magnetization of 80.0 emu/g and an erasing characteristic of 52.8 dB.

EXAMPLES 2 TO 7, COMPARATIVE EXAMPLES 1 TO 4

Acicular magnetic iron oxide particles were obtained in the same way as in Example 1 except for varying the kind of precursor particles, the kind and the amount of aqueous solution of an Fe(II) salt, the kind and the amount of Sr salt, Ba salt or Sr salt and Ba salt, the kind and the amount of specific compound, the temperature of the solution and the OH-group content in the solution.

The main producing conditions are shown in Table 1 and the properties of the modified acicular magnetic iron oxide particles are shown in Table 2.

TABLE 1

| Examples and Comparative Examples | Kind of precursor particles | Modifying condition | | | | | |
|---|---|---|---|---|---|---|---|
| | | Co salt | | $Fe^{++}$ salt | | Ba salt or Sr salt | |
| | | Kind | Amount (wt %) | Kind | Amount (wt %) | Kind | Amount (wt %) |
| Example 1 | Acicular maghemite particles (major axial diameter 0.2 μm; aspect ratio 7.0; BET 36.2 m²/g; coercive force 370 Oe; and saturation magnetization 74.0 emu/g) | $CoSO_4$ | 3.0 | $FeSO_4$ | 7.0 | $SrSO_4$ | 0.25 |
| Example 2 | Acicular maghemite particles (major axial diameter 0.2 μm; aspect ratio 7.0; BET 36.2 m²/g; coercive force 370 Oe; and saturation magnetization 74.0 emu/g) | " | 2.6 | " | 9.0 | $SrSO_4$ | 1.0 |
| Example 3 | Acicular maghemite particles (major axial diameter 0.2 μm; aspect ratio 7.0; BET 36.2 m²/g; coercive force 370 Oe; and saturation magnetization 74.0 emu/g) | " | 2.6 | " | 9.0 | $SrSO_4$ | 1.0 |
| Example 4 | Acicular maghemite particles (major axial diameter 0.27 μm; aspect ratio 6.8; BET 30.0 m²/g; coercive force 380 Oe; and saturation magnetization 75.0 emu/g) | " | 2.6 | " | 9.0 | $SrSO_4$ | 1.0 |
| Example 5 | Acicular maghemite particles (major axial diameter 0.27 μm; aspect ratio 6.8; BET 30.0 m²/g; coercive force 380 Oe; and saturation magnetization 75.0 emu/g) | " | 0.5 | " | 1.0 | $SrSO_4$ | 0.25 |
| Example 6 | Acicular maghemite particles in Example 1 | " | 2.6 | " | 9.0 | $Ba(OH)_2$ | 1.3 |
| Example 7 | Acicular maghemite particles in Example 1 | " | 2.5 | " | 9.0 | $SrSO_4$ | 1.0 |
| Comparative Example 1 | Acicular maghemite particles in Example 1 | $CoSO_4$ | 2.6 | $FeSO_4$ | 9.0 | — | — |
| Comparative Example 2 | Acicular maghemite particles in Example 1 | " | 2.6 | " | 9.0 | — | — |
| Comparative Example 3 | Acicular maghemite particles in Example 1 | " | 2.6 | " | 9.0 | $SrSO_4$ | 1.3 |
| Comparative Example 4 | Acicular maghemite particles in Example 1 | " | 2.6 | " | 9.0 | $Ba(OH)_2$ | 1.0 |

| Examples and Comparative Examples | Specific compound | | Temperature of solution (°C.) | OH-group content (mol/l) |
|---|---|---|---|---|
| | Kind | Amount (wt %) | | |
| Example 1 | Water glass | Si/precursor = 0.187 | 100 | 2.0 |
| Example 2 | $NaAlO_2$ | Al/precursor = 0.05 | 90 | 2.0 |
| Example 3 | $Al_2(SO_4)_3$ and Water glass | Al/precursor = 0.07 Si/precursor = 0.047 | 100 | 2.0 |
| Example 4 | $ZnSO_4$ | Zn/precursor = 1.0 | 100 | 2.0 |
| Example 5 | Water glass | Si/precursor = 0.187 | 100 | 2.0 |
| Example 6 | Colloidal silica | Si/precursor = 0.187 | 100 | 2.0 |
| Example 7 | $MgSo_4$ | Mg/precursor = 0.05 | 100 | 2.0 |
| Comparative Example 1 | Water glass | Si/precursor = 0.187 | 100 | 2.0 |
| Comparative Example 2 | — | — | 100 | 2.0 |
| Comparative | — | — | 100 | 2.0 |

TABLE 1-continued

|  | Example 3 Comparative Example 4 | — | — | 100 | 2.0 |

TABLE 2

| Examples and Comparative Examples | Modified magnetic iron oxide particles | | | | | |
|---|---|---|---|---|---|---|
| | Major axial diameter ($\mu$m) | Aspect ratio (major axial diameter/ minor axial diameter) | BET specific surface area ($m^2/g$) | Coercive force (Oe) | Saturation magnetization (emu/g) | Erasing characteristic (dB) |
| Example 1 | 0.20 | 6.9 | 35.2 | 762 | 80.0 | 52.8 |
| Example 2 | 0.20 | 6.9 | 35.2 | 696 | 79.4 | 48.2 |
| Example 3 | 0.20 | 6.9 | 35.0 | 665 | 79.8 | 50.9 |
| Example 4 | 0.27 | 6.7 | 29.5 | 684 | 79.0 | 48.1 |
| Example 5 | 0.27 | 6.8 | 29.8 | 425 | 77.0 | 53.8 |
| Example 6 | 0.20 | 6.9 | 35.5 | 685 | 80.1 | 49.4 |
| Example 7 | 0.20 | 6.9 | 35.5 | 644 | 79.9 | 58.1 |
| Comparative Example 1 | 0.20 | 6.9 | 35.3 | 675 | 79.8 | 45.9 |
| Comparative Example 2 | 0.20 | 6.9 | 35.2 | 652 | 79.5 | 44.0 |
| Comparative Example 3 | 0.20 | 6.9 | 35.2 | 675 | 79.5 | 46.2 |
| Comparative Example 4 | 0.20 | 6.9 | 35.1 | 660 | 79.5 | 46.0 |

What is claimed is:

1. Acicular magnetic iron particles having an average major axial diameter of 0.05 to 1.0 $\mu$m, an aspect ratio (major axial diameter/minor axial diameter) of 3 to 15, a BET specific surface area of 10 to 80 $m^2/g$, and an erasing characteristic of not less than 46.5 dB, which particles contain Co or Co and Fe(II); Sr, Ba, or both Sr and Ba; and at least one of Si, Al, Zn or Mg, said particles produced by the process of (a) mixing an aqueous dispersion of acicular magnetic iron oxide particles with an aqueous solution of a Co salt and an alkaline aqueous solution, or an aqueous solution of a Co salt, an aqueous solution of an Fe(II) salt and an alkaline aqueous solution to produce an alkaline suspension solution;
   (b) heat-treating the alkaline suspension solution thus obtained at a temperature of 50° to 100° C.

wherein a Sr salt, a Ba salt or both a Sr salt and a Ba salt are added to said alkaline suspension solution before heat-treatment, and wherein one or more of a Si compound, an Al compound, a Zn compound or a Mg compound is added to said alkaline suspension solution before heat-treatment or during heat-treatment; provided the amount of aqueous solution of a Co salt added is 0.1 to 15 wt % calculated as Co based on said acicular magnetic iron oxide particles, the amount of aqueous solution of an Fe(II) salt added is 0.1 to 15 wt % calculated as Fe(II) based on said acicular magnetic iron oxide particles, the OH-group content in said alkaline suspension solution after addition of said alkaline aqueous solution is 0.05 to 3.0 mol/l, the amount of Sr salt, Ba salt or both Sr salt and Ba salt added is 0.05 to 10 wt % calculated as Ba or Sr or both Ba and Sr based on said acicular magnetic iron oxide particles, and the Si compound, Al compound, Zn compound or Mg compound added is 0.1 to 5 wt % calculated as Si, Al, Zn or Mg based on said acicular magnetic iron oxide particles.

* * * * *